United States Patent Office 3,726,832
Patented Apr. 10, 1973

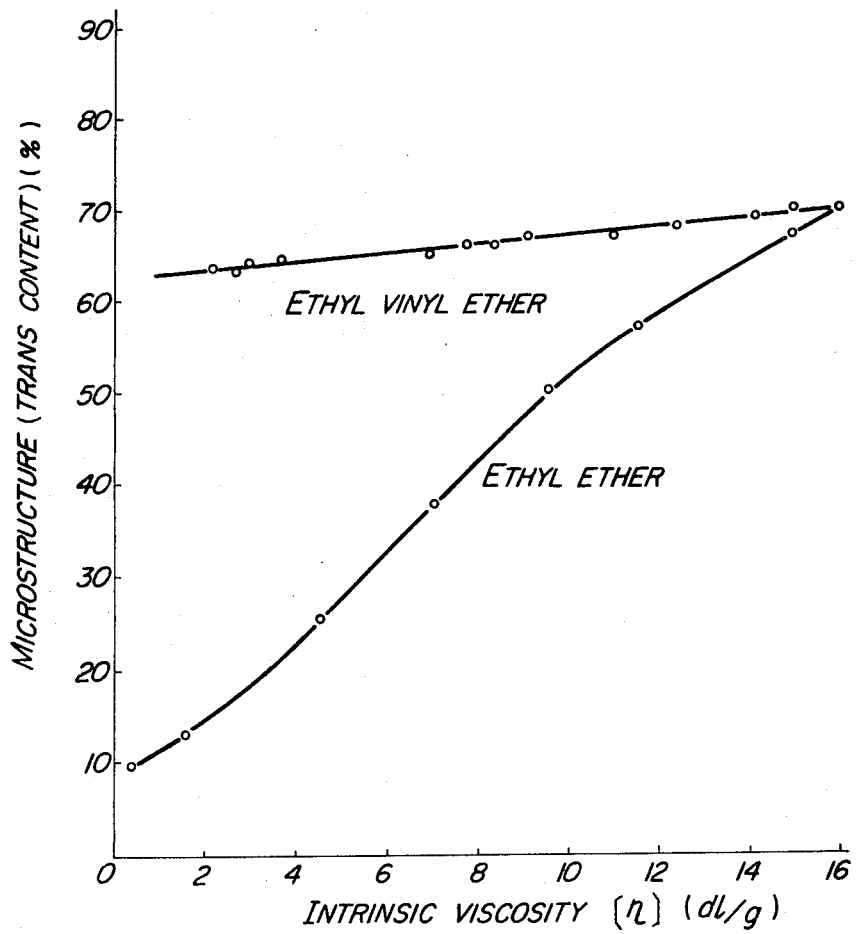

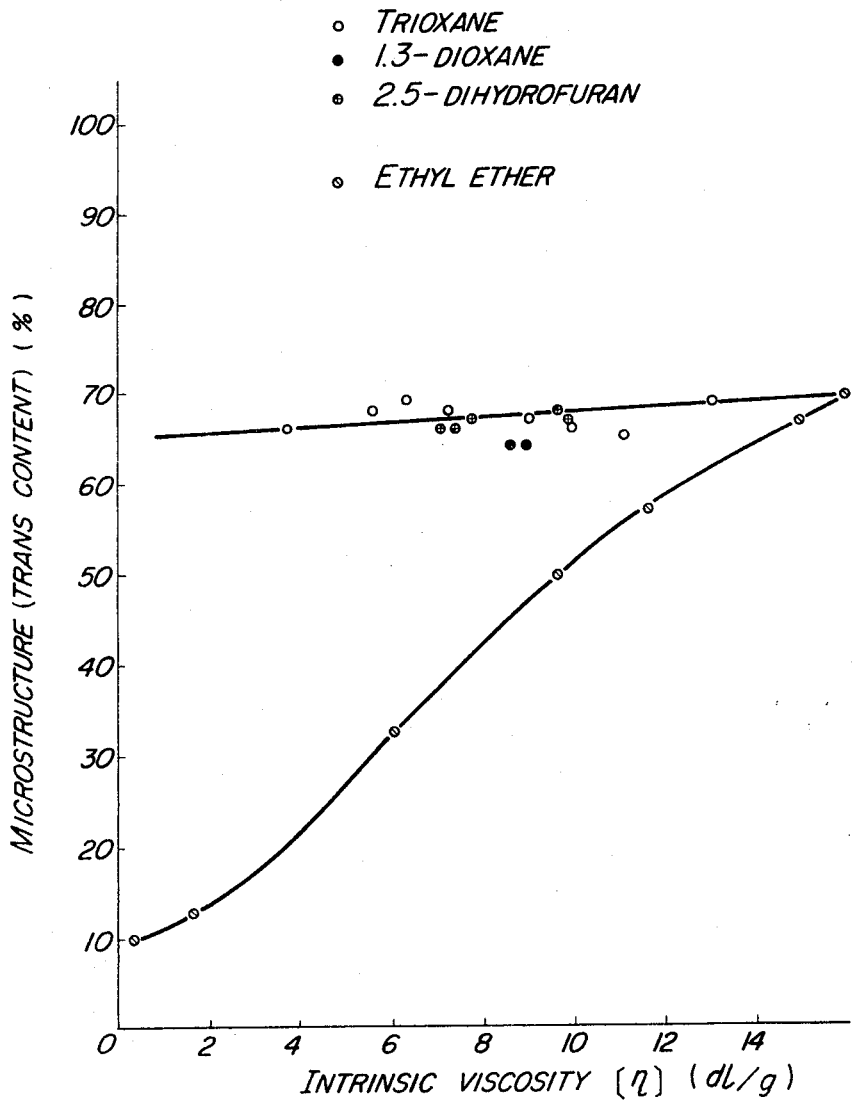

3,726,832
CYCLIC ETHERS AND VINYL ETHERS AS
MOLECULAR WEIGHT REGULATORS IN
ALFIN POLYMERIZATIONS
Koei Komatsu and Shigeyuki Nishiyama, Yokohama, Noboru Ohshima, Tokyo, and Nobuyuki Sakabe, Kawasaki, Japan, assignors to Japan Synthetic Rubber Co., Ltd., Tokyo, Japan
Filed Mar. 19, 1971, Ser. No. 125,940
Claims priority, application Japan, Apr. 3, 1970, 45/27,887
Int. Cl. C08f 1/80
U.S. Cl. 260—47 UA          33 Claims

ABSTRACT OF THE DISCLOSURE

Conjugated diolefin polymers having a molecular weight of less than 1,000,000 can be produced at a high polymerization rate and in a high yield by homopolymerizing or copolymerizing a conjugated diolefin or a mixture thereof with a vinyl aromatic hydrocarbon in the presence of an alfin catalyst by using, as a molecular weight regulator, a cyclic ether having an —O—$CH_2$—O— or

—O—$CH_2$—CH=CH— radical in its ring or a vinyl ether having the formula $CH_2$=$CHOR^1$ or $CH_2$=$CHO(CH_2CH_2O)_nR^2$, wherein $n$ is an integer of from 1 to 3, and $R^1$ and $R^2$ are alkyl groups having 1 to 10 carbon atoms, alkenyl groups, phenyl groups, aralkyl groups or cycloalkyl groups or a mixture of the cyclic ether and the vinyl ether. The above-mentioned molecular weight regulator not only displays a prominent molecular weight-regulating effect, even when used in a small amount, but also is easily commercially obtainable and inexpensive, so that marked commercial advantages can be attained.

---

The present invention relates to a process for producing polymers of conjugated diolefins or copolymers of conjugated diolefins with vinyl aromatic hydrocarbons. More particularly, the invention pertains to a process for homopolymerizing conjugated diolefins or copolymerizing the same with vinyl aromatic hydrocarbons in the presence of an alfin catalyst using a cyclic ether or vinyl ether as a molecular weight regulator.

A process for homopolymerizing conjugated diolefins or copolymerizing the same with vinyl aromatic hydrocarbons in the presence of an alfin catalyst has already been known. Alfin catalysts are markedly high in polymerization rate and polymerization yield, and give polymers excellent in such properties as abrasion resistance, tensile strength and flex-crack resistance, in general. However, the polymers are excessively high in molecular weight (ordinarily 2,000,000 to 12,000,000), so that according to a conventional solution-polymerization, the solution viscosity of the reaction system becomes markedly high even when the monomer concentration is made extremely low, with the result that the transfer of material and heat in the reaction system becomes difficult. Thus, it has been substantially impossible to carry out the above-mentioned process on a commercial scale. Moreover, the alfin polymers, despite their having the above-mentioned excellent properties as synthetic rubbers, are extremely difficult to process because of their excessively high molecular weights.

Accordingly, the alfin polymers have not been deemed suitable for use as practical synthetic rubbers, though many studies have been made with respect thereto. In view of the above, coupled with the difficulty in steps for production thereof, synthetic rubbers have hitherto not been produced with an alfin catalyst on a commercial scale.

In order to overcome the above-mentioned difficulties, many attempts have been made to lower the molecular weights of the resulting polymers by adding molecular weight regulators suitable for use in combination with the alfin catalysts. However, almost all of these attempts have failed to give satisfactory effects. Molecular weight regulators should be substances which can lower to less than 1,000,000 the molecular weights of polymers obtained by use of conventional alfin catalysts and which have no marked adverse influence on polymerization rate, polymerization conversion and the gel contents and microstructures of the polymers. As molecular weight regulators having such properties as mentioned above, there have heretofore been known dihydro aromatic compounds [Japanese patent publication No. 15,034/62, and V. L. Hamseley et al.: "Rubber Age," vol. 94, No. 1, p. 87 (October 1963)]. Further, as molecular weight regulators which are more effective than those mentioned above, there have been proposed 1,4-pentadienes and 1,5-hexadienes. Among these, 1,4-pentadienes are particularly effective. However, they are difficult to commercially obtain, and therefore, problems have still been left for the commercial scale production of alfin rubbers.

An object of the present invention is to provide a process for producing polymers of conjugated diolefins or copolymers of conjugated diolefins with vinyl aromatic hydrocarbons which have a suitably controlled molecular weight.

Another object of the invention is to provide a process for producing polymers of conjugated diolefins or copolymers of conjugated diolefins with vinyl aromatic hydrocarbons which have a micro-structure of a high trans content.

A further object of the present invention is to provide a process for producing polymers or copolymers of conjugated diolefins which have a molecular weight of less than 1,000,000 by use of a commercially easily obtainable and inexpensive molecular weight regulator.

Other objects and advantages of the present invention will become apparent to those skilled in the art from the following description.

In accordance with the present invention, there is provided a process for producing polymers of conjugated diolefins which comprises polymerizing at least one conjugated diolefin alone or in admixture with at least one vinyl aromatic hydrocarbon with an alfin catalyst preferably in a hydrocarbon solvent, characterized in that said polymerization is effected in the presence, as a moelcular weight regulator, of a cyclic ether having an

—O—$CH_2$—O— or —O—$CH_2$—CH=CH— radical in its ring or a vinyl ether having the formula $CH_2$=$CHOR^1$ or $CH_2$=$CHO(CH_2CH_2O)_nR^2$ wherein $n$ is an integer of from 1 to 3, and $R^1$ and $R^2$ are alkyl groups having 1 to 10 carbon atoms, alkenyl groups, phenyl groups, aralkyl groups or cycloalkyl groups, or a mixture of the cyclic ether and the vinyl ether.

Examples of the cyclic ether used as the molecular weight regulator in the present process include trioxane, 1,3-dioxane, 1,3-dioxolan, 2,5-dihydrofuran and the like. The cyclic ether may have substituents inert to organosodium, such as lower alkyl radicals.

As the vinyl ether of the type of $CH_2$=$CHOR^1$ used as the molecular weight regulator in the present process, there are mentioned vinyl methyl ether, vinyl ethyl ether, vinyl propyl ether, vinyl n-butyl ether, vinyl isobutyl ether, vinyl pentyl ether, vinyl hexyl ether, vinyl heptyl ether, vinyl octyl ether, vinyl nonyl ether, vinyl decyl ether, divinyl ether, vinyl allyl ether, vinyl phenyl ether, vinyl benzyl ether, vinyl cyclohexyl ether, vinyl cyclopentyl ether and the like.

As the vinyl ether of the type of $$CH_2=CHO(CH_2CH_2O)_nR^2$$

there are mentioned ethylene glycol methyl vinyl ether, ethylene glycol ethyl vinyl ether, diethylene glycol divinyl ether, triethylene glycol divinyl ether and the like.

The molecular weight regulator is used in a proportion of generally 1 to 1,000 mmol, preferably 10 to 800 mmol, per 100 g. of the monomer.

The manner of addition of the molecular weight regulator is not particularly restricted. However, the molecular weight regulator is preferably added to the monomer before contacting the monomer with the catalyst and used after being diluted with a polymerization solvent. The degree of dilution is ordinarily 0.1 to 1.0 mol/liter.

A typical alfin catalyst employed in the present invention is a ternary mixture or complex compound of allyl sodium, sodium isopropoxide and sodium chloride, which is obtained by reacting n-amyl chloride with sodium dispersion with stirring in a hydrocarbon solvent and then reacting the resulting n-amyl sodium with isopropyl alcohol and propylene successively. The allyl sodium may, of course, be replaced by any of benzyl sodium, xylyl sodium, pentenyl sodium, cymyl sodium and mesitylyl sodium, as is well known [refer to, for example, Leo Reich and A. Schindler, "Polymerization by Organometallic Compounds," pp. 402–430 (1966), Interscience Publishers]. Further, the isopropoxide may be replaced by 2-butoxide, 3-pentoxide, cyclopentoxide, cyclobutoxide or t-butoxide, and the sodium salt may be replaced by other alkali metal salts, such as potassium salt, lithium salt and the like.

The conditions for the preparation of the alfin catalyst and the ratio of the individual components in the catalyst may, of course, be freely varied according to known processes.

Monomers which can be polymerized according to the present invention are conjugated dienes, such as 1,3-butadiene, isoprene, piperylene, 2,3-dimethyl-1,3-butadiene and the like. These conjugated dienes may be used either alone or in admixture of 2 or more. Further, at least one of these conjugated dienes may be copolymerized with at least one of such vinyl aromatic hydrocarbons as styrene, divinylbenzene, $\alpha$-methylstyrene, $\beta$-methylstyrene, 3-vinyltoluene, 1-vinylnaphthalene, 2-vinylnaphthalene, p-methoxystyrene, p-bromostyrene and the like.

The polymerization can be effected, either continuously or in a batch-wise manner, by contacting the monomer or monomers with the alfin catalyst in a hydrocarbon solvent in the presence of the molecular weight regulator according to a process known per se.

The polymerization temperature is ordinarily about $-50°$ C. to $+150°$ C., preferably about $-20°$ C. to $+80°$ C. The pressure of the reaction system may be any pressure so far as the reaction mixture can be maintained in a liquid phase, and is ordinarily about 1 to 5 atm.

It is desirable that the polymerization reaction is effected in an atmosphere of such an inert gas as argon, helium, nitrogen or the like.

The amount of the catalyst in terms of allyl sodium is about 0.01 to 500 mmol, preferably 0.1 to 100 mmol, per 100 g. of the monomer.

The polymerization may be effected in the absence of solvent, though it is preferably effected in a hydrocarbon solvent. The amount of the hydrocarbon solvent used as the polymerization solvent is about 1 to 100 times the weight of the monomer employed. Examples of the hydrocarbon solvent include aliphatic hydrocarbons such as n-pentane, isopentane, n-hexane, n-heptane, n-octane and isooctane; alicyclic hydrocarbons such as cyclohexane and cyclooctane; aromatic hydrocarbons such as benzene, toluene and xylene; and partially hydrogenated aromatic hydrocarbons such as Tetralin. These solvents may be used either alone or in admixture of 2 or more.

When the polymerization reaction has progressed to a desired stage, a catalyst-deactivating agent such as water, alcohol or the like is added to the reaction mixture to terminate the reaction, and then the solvent is removed according to an ordinary procedure to obtain a desired polymer or copolymer. It is desirable that prior to removal of the solvent, such an antioxidant as phenyl-$\beta$-naphthylamine is added to the reaction mixture.

The following are typical examples of polymerization illustrating the process of the present invention, but these examples are not to be construed in any way as limiting the scope of the present invention. In the examples, the intrinsic viscosity of each polymer was measured in toluene at 30° C. by use of a Ubbelohde's viscometer; the micro-structure of polybutadiene was measured according to the infrared absorption spectrum method proposed by D. Morero [Chim. e Ind., 41, 758 (1959)]; and the amount of styrene in the butadiene-styrene copolymer was spectroscopically determined by use of the absorbancy at 699 cm.$^{-1}$ of the infrared absorption spectrum thereof.

The alfin catalyst used in each of the examples and the reference examples set forth below was prepared in the following manner:

300 g. of dry n-hexane was fed to a four-necked flask equipped with a stirrer, a reflux condenser, a thermometer and an external cooling bath. To the flask was added 23 g. (1.0 g. atom) of sodium which had been finely divided to a size of about 2 microns, and the content of the flask was cooled to $-10°$ C. Subsequently, 53.3 g. (0.5 mol) of dry n-amyl chloride was added gradually with mild stirring. During this time, the reaction system was kept at $-10°$ C. After completion of the addition, the stirring was further continued for about 1 hour. Thereafter, 15 g. (0.25 mol) of dry isopropyl alcohol was gradually added with stirring, and then the stirring was further continued for an additional 45 minutes. After introducing an excess of dry propylene into the reaction system, the reaction temperature was maintained at $-10°$ C. until the reflux of the propylene took place. Thereafter, the temperature was gradually elevated and finally brought up to 25° C. In this state, the stirring was continued for about 2 hours, and then, the excess propylene was removed from the system. To this was added dry n-hexane to make the total amount 800 ml. All the above operations were effected in a nitrogen gas atmosphere.

The attached drawings show a comparison between the polymer obtained by the present process and that obtained by a conventional method. That is, FIG. 1 is a graph showing the intrinsic viscosity-micro-structure (trans content) relations of the polybutadiene obtained by use of ethyl vinyl ether as a molecular weight regulator and the polybutadiene obtained by use of ethyl ether as used in U.S. Pat. 2,841,574. FIG. 2 is a graph showing the intrinsic viscosity-micro-structure (trans content) relations of the polybutadienes obtained by use of trioxane, 1,3-dioxane, 2,5-dihydrofuran and ethyl ether as a molecular weight regulator. As is clear from FIGS. 1 and 2, the products obtained according to the present invention maintain higher trans content which is a characteristic feature of an alfin rubber and suit to be used for tire.

REFERENCE EXAMPLE 1

17.5 g. of dry n-hexane was fed to a 100-ml. glass pressure polymerization bottle, which had sufficiently been filled with high purity nitrogen gas, and the bottle was tightly closed with a crown cap. To the bottle was added 5.4 g. of butadiene by means of a syringe, and 0.9 mmol (as allyl sodium) of an alfin catalyst was then added.

After shaking the bottle at 25° C. for 2 hours, the crown cap of the bottle was removed, and the contents of the bottle were added to 200 ml. of isopropyl alcohol containing 2% by weight of an antioxidant, whereby the polymerization product was coagulated. Subsequently, the product was subjected 2 times to water washing to remove the inorganic residue, washed again with isopropyl alcohol and then dried for 24 hours under reduced pressure at 40° C. The thus obtained result was as shown in Table 1.

EXAMPLES 1 TO 3

The same procedure as in Reference Example 1 was repeated, except that methyl vinyl ether was used as a molecular weight regulator in such amounts as shown in Table 1. The results obtained were as set forth in Table 1.

TABLE 1

| | Amount of molecular weight regulator (mmol) | Yield (percent by weight) | Intrinsic viscosity (dl./g.) |
|---|---|---|---|
| Reference Example 1 | 0 | 100 | 20.5 |
| Example: | | | |
| 1 | 4.5 | 52 | 8.3 |
| 2 | 9.0 | 47 | 6.9 |
| 3 | 15.0 | 30 | 6.3 |

The micro-structure of butadiene polymer obtained according to Examples 1 to 3 was 67% of trans-configuration, 29% of vinyl-configuration and 4% of cis-configuration.

REFERENCE EXAMPLE 2

The same procedure as in Reference Example 1 was repeated, except that 5.4 g. of isoprene was substituted for the butadiene in Reference Example 1. The results obtained were as set forth in Table 2.

EXAMPLES 4 TO 6

The same procedure as in Reference Example 2 was repeated, except that n-butyl vinyl ether was used as a molecular weight regulator in such amounts as shown in Table 2. The results obtained were as set forth in Table 2.

TABLE 2

| | Amount of molecular weight regulator (mmol) | Yield (percent by weight) | Intrinsic viscosity (dl./g.) |
|---|---|---|---|
| Reference Example 2 | 0 | 100 | 16.5 |
| Example: | | | |
| 4 | 0.90 | 61 | 7.7 |
| 5 | 2.25 | 43 | 6.3 |
| 6 | 4.50 | 38 | 5.3 |

EXAMPLES 7 TO 12

The same procedure as in Reference Example 1 was repeated, except that the compounds described in Table 3 were used as a molecular weight regulator in such amounts as described in Table 3. The results obtained were as set forth in Table 3.

TABLE 3

| | Molecular weight regulator | | Yield (percent by weight) | Intrinsic viscosity (dl./g.) |
|---|---|---|---|---|
| | Name of compound | Amount (mmol) | | |
| Reference Example 1 | | 0 | 100 | 20.5 |
| Example: | | | | |
| 7 | Ethyl vinyl ether | 10.0 | 27 | 6.1 |
| 8 | n-Butyl vinyl ether | 16.0 | 59 | 9.1 |
| 9 | do | 32.0 | 44 | 7.7 |
| 10 | Isobutyl vinyl ether | 19.5 | 45 | 10.6 |
| 11 [1] | Isoctyl vinyl ether | 16.6 | 25 | 11.0 |
| 12 | Di-ethylene glycol di-vinyl ether | 0.42 | 13 | 7.2 |

[1] Polymerization time, 5 hrs.

The micro-structure of butadiene polymers obtained according to Examples 7 to 12 was 67% of trans-configuration, 29% of vinyl-configuration and 4% of cis-configuration.

EXAMPLES 13 TO 14 and REFERENCE EXAMPLES 3 TO 4

The same procedure as in Reference Example 1 was repeated, except that the compounds described in Table 4 were used as molecular weight regulators in such amounts as described in Table 4 and that the polymerization was effected for the periods of time described in Table 4. The results obtained were as set forth in Table 4.

TABLE 4

| | Molecular weight regulator | | Time (hrs.) | Yield (percent by weight) | Intrinsic viscosity (dl./g.) | Micro-structure (percent) | | |
|---|---|---|---|---|---|---|---|---|
| | Name of compound | Amount (mmol) | | | | Trans | Vinyl | Cis |
| Reference Example: | | | | | | | | |
| 3 | Ethyl ether | 236.0 | 22 | 46 | 1.6 | 13 | 84 | 3 |
| 4 | Ethylene glycol dimethyl ether | 38.8 | 22 | 98 | 0.4 | 10 | 85 | 3 |
| Example: | | | | | | | | |
| 13 | Ethyl vinyl ether | 15.0 | 2 | 65 | 7.3 | 67 | 28 | 5 |
| 14 [1] | do | 4.0 | 2 | 20 | 3.7 | 64 | 32 | 4 |

[1] Polymerization temperature, 80°

REFERENCE EXAMPLE 5

The same procedure as in Reference Example 1 was repeated, except that the catalyst was used in an amount of 0.8 mmol (as allyl sodium). The results obtained were as set forth in Table 5.

EXAMPLES 15 TO 19

The same procedure as in Reference Example 5 was repeated, except that 5.4 g. of isoprene was substituted weight regulator in such amounts as described in Table 5. The results obtained were as set forth in Table 5.

EXAMPLES 23 TO 26

The same procedure as in Reference Example 5 was repeated, except that 1,3-dioxane or 2,5-dihydrofuran was used as a molecular weight regulator in such amounts as described in Table 7. The results obtained were as set forth in Table 7.

TABLE 7

| | Molecular weight regulator | | Yield (percent by weight) | Intrinsic viscosity (dl./g.) | Micro-structure (percent) | | |
|---|---|---|---|---|---|---|---|
| | Name of compound | Amount (mmol) | | | Trans | Vinyl | Cis |
| Reference Example 5 | | 0 | 100 | 19 | 69 | 27 | 4 |
| Example: | | | | | | | |
| 23 | 1,3-dioxane | 2.5 | 50 | 8.5 | 64 | 32 | 4 |
| 24 | 2,5-dihydrofuran | 0.8 | 36 | 9.6 | 68 | 28 | 4 |
| 25 | do | 1.6 | 25 | 9.8 | 67 | 29 | 4 |
| 26 | do | 3.2 | 15 | 7.7 | 67 | 30 | 3 |

TABLE 5

| | Amount of molecular weight regulator (mmol) | Yield (percent by weight) | Intrinsic viscosity (dl./g.) | Micro-structure (percent) | | |
|---|---|---|---|---|---|---|
| | | | | Trans | Vinyl | Cis |
| Reference Example 5 | 0 | 100 | 19 | 69 | 27 | 4 |
| Example: | | | | | | |
| 15 | 0.10 | 89 | 11 | 65 | 31 | 4 |
| 16 | 0.40 | 77 | 8.9 | 67 | 29 | 4 |
| 17 | 0.80 | 37 | 6.2 | 69 | 28 | 3 |
| 18 | 1.60 | 24 | 5.5 | 68 | 28 | 4 |
| 19 | 3.20 | 23 | 3.6 | 66 | 29 | 5 |

REFERENCE EXAMPLE 6

The same procedure as in Reference Example 5 was repeated, except that 5.4 g. of isoprene was substituted for the butadiene in Reference Example 5. The results obtained were as set forth in Table 6.

REFERENCE EXAMPLES 7 TO 11

The same procedure as in Reference Example 5 was repeated, except that the compounds as described in Table 8 were used as a molecular weight regulator in such amounts as described in Table 8. The results obtained were as set forth in Table 8.

TABLE 8

| | Molecular weight regulator | | Yield (percent by weight) | Intrinsic viscosity (dl./g.) | Micro-structure (percent) | | |
|---|---|---|---|---|---|---|---|
| | Name of compound | Amount (mmol) | | | Trans | Vinyl | Cis |
| Reference Example: | | | | | | | |
| 5 | | 0 | 100 | 19 | 69 | 27 | 4 |
| 7 | 1,4-dioxane | 4.0 | 57 | 14 | 69 | 28 | 3 |
| 8 | 2,3-dihydrofuran | 12.8 | 66 | 20 | 69 | 27 | 4 |
| 9 | Tetrahydrofuran | 1.6 | 52 | 22 | 70 | 27 | 3 |
| 10 | Ethyleneoxide | 0.1 | 95 | 19 | 68 | 30 | 2 |
| 11 | Allylglycidyl ether | 0.2 | 80 | 22 | 65 | 31 | 4 |

EXAMPLES 20 TO 22

The same procedure as in Reference Example 6 was repeated, except that trioxane was used as a molecular weight regulator in such amounts as shown in Table 6 and that the polymerization was effected for 4 hours. The results obtained were as set forth in Table 6.

TABLE 6

| | Amount of molecular weight regulator (mmol) | Time (hrs.) | Yield (percent by weight) | Intrinsic viscosity (dl./g.) |
|---|---|---|---|---|
| Reference Example 6 | 0 | 2 | 100 | 17 |
| Example: | | | | |
| 20 | 0.08 | 4 | 63 | 7.3 |
| 21 | 0.80 | 4 | 29 | 3.8 |
| 22 | 1.60 | 4 | 19 | 2.6 |

As is clear from Table 8, the cyclic ethers other than those of the present invention have no effect of regulating the molecular weight.

REFERENCE EXAMPLE 12

The same procedure as in Reference Example 1 was repeated, except that 4.05 g. of butadiene and 1.35 g. of styrene were substituted for 5.4 g. of butadiene in Reference Example 1. The results obtained were as set forth in Table 9.

EXAMPLES 27 TO 30

The same procedure as in Reference Example 12 was repeated, except that the compounds described in Table 9 were used as molecular weight regulators in such amounts as described in Table 9. The results obtained were as set forth in Table 9.

TABLE 9

| | Molecular weight regulator | | Yield (percent by weight) | Intrinsic viscosity (dl./g.) | Styrene content in polymer (percent by weight) |
|---|---|---|---|---|---|
| | Name of compound | Amount (mmol) | | | |
| Reference Example 12 | | 0 | 100 | 18.0 | 25 |
| Example: | | | | | |
| 27 | Ethyl vinyl ether | 15.0 | 70 | 5.5 | 26 |
| 28 | Isobutyl vinyl ether | 16.0 | 65 | 7.7 | 27 |
| 29 | Trioxane | 1.6 | 40 | 4.3 | 28 |
| 30 | 2,5-dihydrofuran | 1.6 | 30 | 7.0 | 30 |

REFERENCE EXAMPLE 13

The same procedure as in Reference Example 1 was repeated, except that 4.32 g. of butadiene and 1.08 g. of isoprene were substituted for 5.4 g. of butadiene in Reference Example 1 and that the polymerization was effected for 5 hours. The thus obtained result was as shown in Table 10.

EXAMPLES 31 TO 34

The same procedure as in Reference Example 13 was repeated, except that the compounds described in Table 10 were used as molecular weight regulators in such amounts as described in Table 10. The results obtained were as set forth in Table 10.

TABLE 10

| | Molecular weight regulator | | Yield (percent by weight) | Intrinsic viscosity (dl./g.) |
|---|---|---|---|---|
| | Name of compound | Amount (mmol) | | |
| Reference Example 13 | | 0 | 100 | 21.0 |
| Example: | | | | |
| 31 | Ethyl vinyl ether | 15.0 | 66 | 5.8 |
| 32 | Isobutyl vinyl ether | 16.0 | 69 | 8.0 |
| 33 | Trioxane | 1.6 | 30 | 4.0 |
| 34 | 2,5-dihydrofuran | 1.6 | 41 | 9.3 |

REFERENCE EXAMPLE 14

The same procedure as in Reference Example 1 was repeated, except that 17.5 g., of cyclohexane was substituted for the n-hexane as the polymerization solvent in Reference Example 1. The results obtained were as set forth in Table 11.

EXAMPLES 35 to 36

Th same procedure as in Reference Example 14 was repeated, except that the compounds described in Table 11 were used as molecular weight regulators in such amounts as described in Table 11. The results obtained were as set forth in Table 11.

TABLE 11

| | Molecular weight regulator | | Yield (percent by weight) | Intrinsic viscosity (dl./g.) |
|---|---|---|---|---|
| | Name of compound | Amount (mmol) | | |
| Reference Example 14 | | 0 | 100 | 21 |
| Example: | | | | |
| 35 | Ethyl vinyl ether | 10.0 | 76 | 8.5 |
| 36 | Trioxane | 1.6 | 57 | 7.2 |

The micro-structure of butadiene polymer obtained according to the above-tabulated examples was 68% of trans-configuration, 29% of vinyl-configuration and 3% of cis-configuration.

REFERENCE EXAMPLE 15

The same procedure as in Reference Example 1 was repeated, except that 17.5 g. of benzene was substituted for the n-hexane as the polymerization solvent in Reference Example 1. The results obtained were as set forth in Table 12.

EXAMPLES 37 TO 38

The same procedure as in Reference Example 15 was repeated, except that the compounds described in Table 12 were used as molecular weight regulators in such amounts as described in Table 12. The results obtained were as set forth in Table 12.

TABLE 12

| | Molecular weight regulator | | Yield (percent by weight) | Intrinsic viscosity (dl./g.) |
|---|---|---|---|---|
| | Name of compound | Amount (mmol) | | |
| Reference Example 15 | | 0 | 100 | 59 |
| Example: | | | | |
| 37 | Ethyl vinyl ether | 10.0 | 65 | 7.3 |
| 38 | Trioxane | 1.6 | 54 | 6.2 |

The micro-structure of butadiene polymer obtained according to the above-tabulated examples was 68% of trans-configuration, 29% of vinyl-configuration and 3% of cis-configuration.

What is claimed is:

1. A process for producing a conjugated diolefin polymer which comprises polymerizing at least one conjugated diolefin or copolymerizing at least one conjugated diolefin with at least one vinyl aromatic hydrocarbon in the presence of an alfin catalyst and a molecular weight regulator, characterized in that the amount of catalyst in terms of allyl sodium is about 0.01 to 500 mmol per 100 g. of monomer, and a cyclic ether having an

—O—CH$_2$—O— or

—O—CH$_2$—CH=CH— radical in its ring or a vinyl ether having the formula, CH$_2$=CHOR$^1$ or CH$_2$=CHO(CH$_2$CH$_2$O)$_n$R$^2$ wherein $n$ is an integer of from 1 to 3, and R$^1$ and R$^2$ are alkyl groups having 1 to 10 carbon atoms, alkenyl groups, phenyl groups, aralkyl groups or cycloalkyl groups, or a mixture of the cyclic ether and the vinyl ether, is used as said molecular weight regulator, the amount of regulator being from about 1 to 1,000 mmol per 100 g. of the monomer.

2. A process according to claim 1, wherein the molecular weight regulator is a cyclic ether having an —O—CH$_2$—O— or —O—CH$_2$—CH=CH— radical.

3. A process according to claim 1 wherein the molecular weight regulator is a vinyl ether having the formula,

CH$_2$=CHOR$^1$ or

CH$_2$=CHO(CH$_2$CH$_2$O)$_n$R$^2$ wherein R$^1$, R$^2$ and $n$ are the same as defined above.

4. A process according to claim 2, wherein the cyclic ether is trioxane, 1,3-dioxane, 1,3-dioxolan or 2,5-dihydrofuran.

5. A process according to claim 3, wherein the vinyl ether is vinyl methyl ether, vinyl ethyl ether, vinyl propyl ether, vinyl n-butyl ether, vinyl isobutyl ether, vinyl pentyl ether, vinyl hexyl ether, vinyl heptyl ether, vinyl octyl ether, vinyl nonyl ether, vinyl decyl ether, divinyl ether, vinyl allyl ether, vinyl phenyl ether, vinyl benzyl ether, vinyl cyclohexyl ether, vinyl cyclopentyl ether, ethylene glycol methyl vinyl ether, ethylene glycol ethyl vinyl ether, diethylene glycol divinyl ether or triethylene glycol divinyl ether.

6. A process according to claim 1, wherein the amount of the molecular weight regulator is 10 to 800 mmol per 100 g. of the monomer.

7. A process according to claim 1, wherein the conjugated diene is butadiene or isoprene or a mixture thereof.

8. A process according to claim 1, wherein the vinyl aromatic hydrocarbon is selected from styrene, divinylbenzene, α-methylstyrene, β-methylstyrene, 3-vinyltoluene, 1-vinylnaphthalene, 2-vinylnaphthalene, p-methoxystyrene and p-bromostyrene.

9. A process according to claim 1, wherein the reaction temperature ranges from −50° C. to +150° C.

10. A process according to claim 1, wherein the pressure in the reaction system is 1 to 5 atm.

11. A process according to claim 1, wherein the reaction is effected in an inert gas atmosphere.

12. A process according to claim 1, wherein the polymerization is effected in a hydrocarbon solvent.

13. A process according to claim 12, wherein the hydrocarbon solvent is an aliphatic hydrocarbon, an alicyclic hydrocarbon, an aromatic hydrocarbon or a partially hydrogenated aromatic hydrocarbon.

14. A process according to claim 12, wherein the hydrocarbon solvent is n-pentane, isopentane, n-hexane, n-heptane, n-octane, isooctane, cyclohexane, cyclooctane, benzene, toluene, xylene or Tetralin, or a mixture thereof.

15. A process according to claim 12, wherein the amount of the solvent is 1 to 100 times the weight of the monomer.

16. A process according to claim 1, wherein the amount of the catalyst is 0.1 to 100 mmol as allyl sodium per 100 g. of the monomer.

17. A process according to claim 2, wherein the reaction temperature ranges from −50° C. to +150° C. and pressure within the reaction system is 1 to 5 atm.

18. A process according to claim 1, wherein the reaction temperature ranges from −50° C. to +150° C. and pressure within the reaction system is 1 to 5 atm.

19. A process according to claim 12, wherein the molecular weight regulator is added to the monomer before contacting the monomer with the catalyst and used after being diluted with said hydrocarbon solvent.

20. A process for producing a conjugated diolefin polymer which comprises polymerizing at least one conjugated diolefin or copolymerizing at least one conjugated diolefin with at least one vinyl aromatic hydrocarbon in the presence of an alfin catalyst and a molecular weight regulator, characterized in that the amount of catalysts in terms of allyl sodium is about 0.01 to 500 mmol per 100 g. of monomer, and a vinyl ether having the formula, $CH_2=CHOR^1$ or $CH_2=CHO(CH_2CH_2O)_nR^2$, wherein $n$ is an integer of from 1 to 3, and $R^1$ and $R^2$ are alkyl groups having 1 to 10 carbon atoms, alkenyl groups, phenyl groups, aralkyl groups or cycloalkyl groups, is used as said molecular weight regulator, the amount of regulator being from about 1 to 1,000 mmol per 100 g. of the monomer.

21. A process according to claim 20, wherein the amount of the molecular weight regulator is 10 to 800 mmol per 100 g. of the monomer.

22. A process according to claim 20, wherein the conjugated diene is butadiene or isoprene or a mixture thereof.

23. A process according to claim 20, wherein the vinyl aromatic hydrocarbon is selected from styrene, divinylbenzene, α-methylstyrene, β-methylstyrene, 3-vinyltoluene, 1-vinylnaphthalene, 2-vinylnaphthalene, p-methoxystyrene and p-bromostyrene.

24. A process according to claim 20, wherein the reaction temperature ranges from −50° C. to +150° C.

25. A process according to claim 20, wherein the pressure in the reaction system is 1 to 5 atm.

26. A process according to claim 20, wherein the reaction is effected in an inert gas atmosphere.

27. A process according to claim 20, wherein the amount of the catalyst is 0.1 to 100 mmol as allyl sodium per 100 g. of the monomer.

28. A process according to claim 20, wherein the polymerization is effected in a hydrocarbon solvent.

29. A process according to claim 28, wherein the hydrocarbon solvent is an aliphatic hydrocarbon, an alicyclic hydrocarbon, an aromatic hydrocarbon or a partially hydrogenated aromatic hydrocarbon.

30. A process according to claim 28, wherein the hydrocarbon solvent is n-pentane, isopentane, n-hexane, n-heptane, n-octane, isooctane, cyclooctane, benzene, toluene, xylene or Tetralin, or mixture thereof.

31. A process according to claim 28, wherein the amount of the solvent is 1 to 100 times the weight of the monomer.

32. A process according to claim 28, wherein the molecular weight regulator is added to the monomer before contacting the monomer with the catalyst and used after being diluted with said hydrocarbon solvent.

33. A process according to claim 20, wherein the reaction temperature ranges from −50° C. to +150° C. and the pressure within the reaction system is 1 to 5 atm.

References Cited
UNITED STATES PATENTS

| | | | |
|---|---|---|---|
| 2,841,574 | 7/1958 | Foster | 260—80 |
| 3,067,187 | 12/1962 | Greenberg et al. | 260—94.2 |
| 3,418,297 | 12/1968 | Grinninger et al. | 260—82.1 |
| 3,423,379 | 1/1969 | Grinninger et al. | 260—82.1 |

JAMES A. SEIDLECK, Primary Examiner

S. M. LEVIN, Assistant Examiner

U.S. Cl. X.R.

260—80.7, 82.1, 83.7, 94.2 M